G. W. SWINBURNE.
METHOD OF PURIFYING AND STERILIZING LIQUID.
APPLICATION FILED JUNE 21, 1910.
1,079,377.
Patented Nov. 25, 1913.
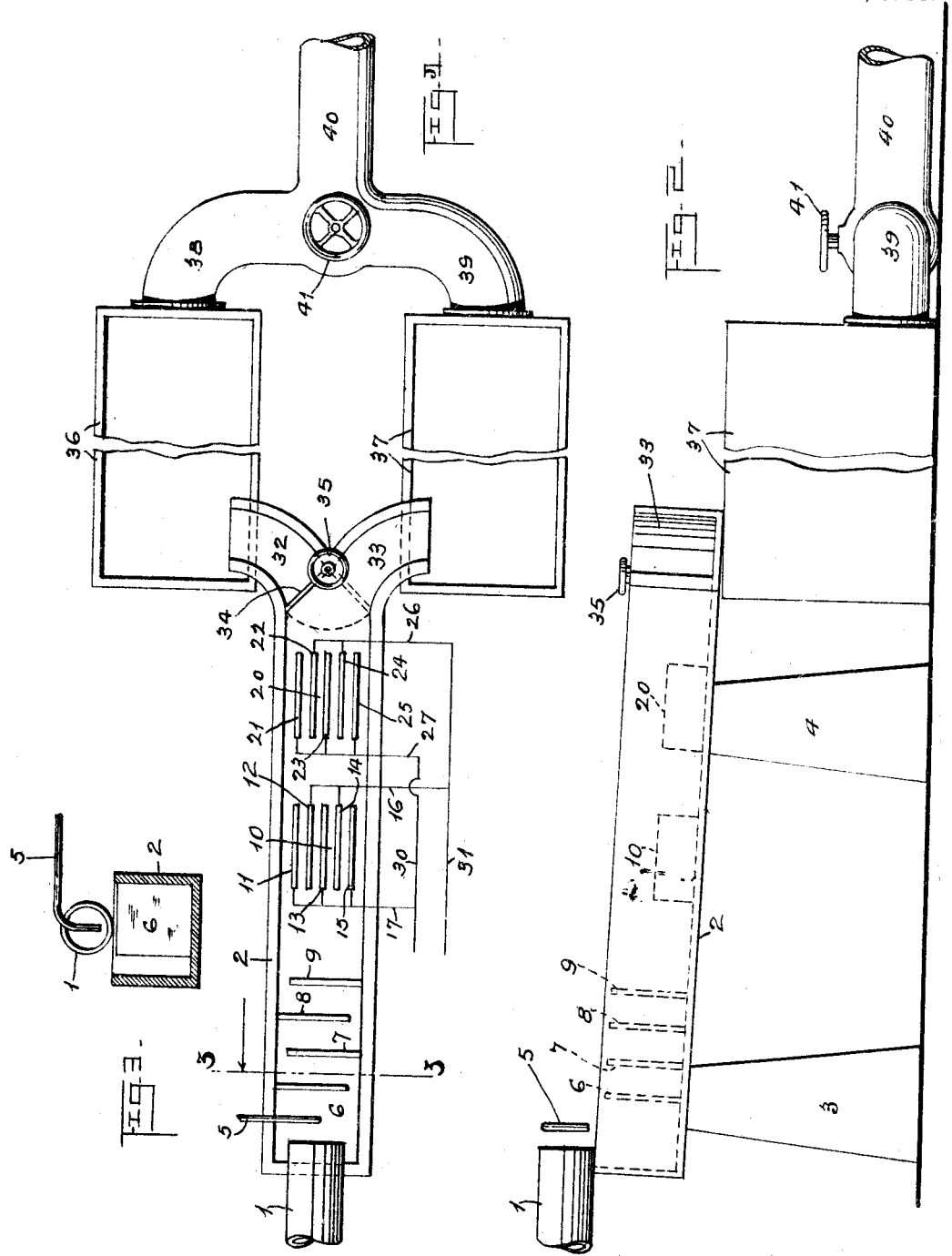
WITNESSES:
Frances E. Blodgett
Elsa C. Gopfrich
INVENTOR
George W. Swinburne
BY
Russell M. Everett
ATTORNEY.

UNITED STATES PATENT OFFICE.

GEORGE W. SWINBURNE, OF EAST ORANGE, NEW JERSEY, ASSIGNOR TO STERILIZATION COMPANY, A CORPORATION OF NEW JERSEY.

METHOD OF PURIFYING AND STERILIZING LIQUID.

1,079,377.     Specification of Letters Patent.     Patented Nov. 25, 1913.

Application filed June 21, 1910. Serial No. 568,112.

*To all whom it may concern:*

Be it known that I, GEORGE W. SWINBURNE, a citizen of the United States, residing at East Orange, in the county of Essex and State of New Jersey, have invented certain Improvements in Methods of Purifying and Sterilizing Liquid, of which the following is a specification.

The objects of this invention are to purify and sterilize sewage or the like, or to sterilize water, such as the supply of municipalities; to do this by freeing chlorin and oxygen by electrolytic action; to increase the efficiency of an electrolytic apparatus so that a greater volume of liquid can be treated in a given time; to reduce the cost of destroying the impurities and germs and oxygen while in a nascent state, and to obtain other advantages and results as may be brought out in the following description.

Referring to the accompanying drawings, in which like numerals of reference indicate the same parts throughout the several figures, Figure 1 is a plan of an apparatus which can be utilized for carrying out my improved process; Fig. 2 shows the same in side elevation, and Fig. 3 is a cross-section on line 3—3, Fig. 1, looking in the direction indicated by the arrow.

In carrying out my invention, I add to the liquid to be purified and sterilized, or simply sterilized, some compound of chlorin, so as to introduce into said liquid more combined chlorin than it originally contains. Any chlorid can be used, but in practice sodium chlorid or common salt will probably be preferred on account of its cheapness. I do not restrict myself thereto, however. The chlorid may be introduced either as a solution, in powdered form, or in any other way, and any suitable means for introducing the chlorid may be employed. It is preferable upon introduction of the chlorid to mix it thoroughly with the liquid to be purified or sterilized, and any suitable means may be employed for such mixing, as necessary or desirable. The amount of chlorin introduced varies according to the quantity of the available chlorin already in the liquid to be treated, and also according to the degree of purification or sterilization which is desired.

The liquid to be purified or sterilized, after having the chlorid mixed with it, is submitted to electrolytic action in any suitable and well-known manner, as by causing the mixture to flow past suitable electrodes. By this electrolysis both the water of the liquid and the chlorid which has been mixed with it are decomposed, and a portion of the oxygen from the water unites with the chlorin and its base to form a hypochlorite, the rest of the oxygen being freed in a nascent form. In the presence of organic impurities in a liquid to be purified, the chlorin of the hypochlorite unites with the organic matter, liberating more oxygen in nascent form and all this nascent oxygen in turn acts upon more oganic matter. The amount of chlorin and oxygen freed by these reactions is obviously greatly increased by reason of the chlorid which has been previously mixed with the liquid and thus as high a degree of purification can be obtained as is desired. In other words, by my improved process complete purification and sterilization can be obtained, and the purification and sterilization can be controlled, as desired, by the amount of chlorid added.

After the electrolytic action the liquid is preferably run through a retention tank and may even be allowed to stand for a period of time, for example, an hour or two. The purpose of this is to provide opportunity for the secondary reactions in the purification and sterilization to take place, which are merely chemical reactions and require some interval of time in which to take place fully and completely. Under some conditions, it may be sufficient to simply retard the flow of the liquid for this purpose, without stopping it entirely. In any event, when the liquid has passed this detention period, if employed, my improved process of purification and sterilization is complete.

It is a feature of my invention that the liquid is discharged from the electrolytic apparatus, as into the retention tank or the like, without retarding its passage through said electrolytic apparatus. In other words, the liquid flows unobstructedly over the electrolytic plates and after being acted upon thereby all of the liquid together with the products resulting from the electrolytic action are discharged from the electrolyzing apparatus with an unretarded passage therethrough, said liquid and products of electrolysis being afterward confined, retarded or held up for the secondary or time reactions which will complete the purification or sterilization. This enables me to conduct the liquid to be treated rapidly through the electrolyzing apparatus, so that greater efficiency of said apparatus can be obtained and the cost of treatment greatly reduced.

The liquid upon which my improved process is carried out may be any impure liquid, sewage, liquid to be sterilized, or the like, and in case sewage is being treated it may be in the raw state, an effluent from a septic or sedimentation tank, an effluent from any form of filtration, or sewage or a part thereof at any stage of treatment.

The apparatus for carrying out my improved process forms no part of the present invention claimed herein, but for purposes of illustration I have shown in the drawing an apparatus which could be used for carrying out the process.

In said drawing 1 indicates a pipe or duct of any sort adapted to supply the liquid to be purified and sterilized, said duct 1 being adapted to discharge into a trough 2. Said trough is shown upon supports 3, 4 and slightly inclined so as to cause the liquid to flow slowly along it, the incline being exaggerated in the drawing to show more clearly. I have shown the trough 2 as rectangular in cross-section and with an open top, although it might be of other form or construction. Adjacent to the end of the duct 1, where it discharges into the trough 2 is a tube 5 through which the chlorid may be discharged in any desired quantity into the stream from the duct 1. The mingled streams from the duct 1 and tube 5 fall into the trough and are mixed by any suitable means such as the baffle plates 6 to 9 inclusive which project alternately from opposite sides of the trough 2. Beyond the said baffle plates, in the course of the liquid along the trough 2, are arranged sets 10 and 20 of electrodes, which I have shown placed vertically and longitudinally of the trough, although they might be otherwise arranged. The plates 11, 13 and 15 of one set are connected in parallel by a wire 17 and constitute one of the electrodes, while the other plates 12 and 14 are connected by another wire 16 and constitute the other electrode. Similarly the plates 21, 23 and 25 of the set 20 are connected by a wire 27, and the other plates 22 and 24 by a wire 26. The wires 17 and 27 lead to a main wire 30 and the wires 16 and 26 lead to a main wire 31. In practice, the direction of current is reversed from time to time so that each connected group of plates in a set is alternately the anode and the cathode. Any number of sets of electrodes may be employed as desired.

Beyond the electrodes, the trough 2 divides into branches 32 and 33, access to either of which may be closed by a swinging gate 34 which leaves the other branch open, said gate being controlled by a hand wheel 35. Each of the branches of the trough 2 leads to a tank, as 36 for the branch 32, and 37 for the branch 33. Outlet pipes 38 and 39 lead from the said tanks 36, 37, respectively, to a common flow pipe 40 into communication with which either outlet 38 or 39 may be placed by a suitable valve controlled by a hand wheel 41, while the other outlet is shut off from the flow pipe 40, or both outlets may be closed.

In practice, liquid is allowed to flow from the trough 2 through one branch as 33 until that tank 37 is full, the valve at 41 being closed to that branch meanwhile. The gate 34 is then swung to direct the flow from the trough 2 through the other branch 32 into the tank 36, and the filled tank 37 is allowed to stand until the other tank 36 is half full, for example. The outlet valve is then turned by its hand wheel 41 to permit escape from the tank 37 through its outlet 39 into the main pipe 40, the outlet 38 from the other tank remaining closed meanwhile. The size of the outlets 39 and 38 is such that either tank 37 or 36 will be emptied in half the time required to fill it, and hence when the outlet from the tank 37 is opened as above-described, said tank will be empty by the time the other tank 36 is filled. The outlet of tank 37 is then closed and the gate 34 swung to direct flow thereinto. The tank 36 is allowed to stand, in turn, until the tank 37 is half full, when its outlet is opened and its contents discharged. In this manner the liquid remains stationary for a time, so as to allow opportunity for the secondary reactions to take place fully and completely. Obviously, the said tanks may be of any desired size or number, and may be arranged to hold their contents for any desired length of time.

Having thus described the invention, what I claim is:

1. A process of purifying and sterilizing sewage or other liquid containing a chlorid, consisting in conducting the liquid into an electrolyzing apparatus, discharging the liquid from said apparatus with an unretarded passage therethrough, and afterward confining the liquid until the products resulting from the action of the products of electrolysis upon the liquid have also reacted upon the liquid.

2. A process of purifying and sterilizing sewage or other liquid containing a chlorid, consisting in conducting the liquid into an electrolyzing apparatus, discharging the liquid from said apparatus with an unretarded passage therethrough, and afterward retarding the liquid until the products resulting from the action of the products of electrolysis upon the liquid have also reacted upon the liquid.

3. A process of purifying and sterilizing sewage or other liquid containing a chlorid, consisting in conducting the liquid into an electrolyzing apparatus, discharging the liquid from said apparatus with an unretarded passage therethrough, and afterward holding the liquid at rest until the products resulting from the action of the products of electrolysis upon the liquid have also reacted upon the liquid.

GEORGE W. SWINBURNE.

Witnesses:
RUSSELL M. EVERETT,
FRANCES E. BLODGETT.